Dec. 7, 1965  F. KNOLL  3,221,406
SKINNING KNIFE
Filed July 12, 1963  2 Sheets-Sheet 1

Dec. 7, 1965    F. KNOLL    3,221,406
SKINNING KNIFE
Filed July 12, 1963    2 Sheets-Sheet 2

United States Patent Office 3,221,406
Patented Dec. 7, 1965

3,221,406
SKINNING KNIFE
Fritz Knoll, 21 Konradigasse, Konstanz, Germany
Filed July 12, 1963, Ser. No. 294,476
Claims priority, application Switzerland, July 24, 1962,
8,880/62
8 Claims. (Cl. 30—272)

The invention relates to a skinning knife having a motor propelled blade which is guided between blade protector members which are provided with teeth and are adjustable relative to the blade.

Such skinning knives are already known. It has become apparent that adjustability of the blade protector relative to the cutting edge of the blade has been inadequate in the case of knives which have hitherto been known. Since the cutting edge of the blade has to be re-sharpened periodically, it is necessary to make the blade protector accurately adjustable relative to the cutting edge of the blade. In addition the blade protector members should be capable of displacement in a simple manner in order to expose the blade for re-sharpening. The object of the invention is to provide a skinning knife which fulfills the aforesaid requirements.

The invention is characterised in that the blade protector members are adjustably supported by two adjusting screws which rest on a bracket which is connected to the grip housing, one of the adjusting screws resting on a carriage which is movable longitudinally along the bracket, the carriage being longitudinally slidable by means of a third adjusting screw.

It has also become apparent that the pitch and shape of the teeth of the blade protector, as well as their lateral spacing, which are determined by the thickness of the blade and the clearance in the blade guide slot, are of decisive importance in the operation of the knife.

On the one hand the tooth pitch has to be sufficiently large to enable the skin to bend into the spaces between the teeth of the moving blade with a minimum of working pressure, so as to enable the adipose tissue to be severed. On the other hand the tooth pitch must not be too great since the skin otherwise bends too much into the space between the teeth and an incision is made into the corium even when the knife is operated at the correct angle.

The width of the slot between the two displaced rows of teeth as well as the thickness of the blade and the clearance of the blade in this slot have a decisive effect on the operation of the device for the following reasons. In addition to the great variety of the animals to be skinned (bulls, calves, etc.) there is the further complication of the considerable difference in the anatomical structure of the skin of the different portions of the body of the animal (belly, back, flanks, legs, etc.). The incision which has to sever the skin from the carcass must penetrate neither into the corium nor the flesh; it has to be in the subcutaneous region, viz. the adipose tissue. Any scratching, let alone cutting of the skin is to be avoided since otherwise the skin will be roughened or damaged in the course of the subsequent tanning, whereby it is reduced in value. These conditions can only be fulfilled if a thin layer of the adipose tissue remains on the corium which constitutes a safety margin for the greater or lesser skill of the operator.

This adipose tissue remaining on the corium must however not exceed a certain thickness, since the thickness and consistency of the adipose tissue varies severalfold for different animals. The adipose tissue of a bull is at least five times as thick as that of a calf and after all they both have to be skinned by the same device.

Sometimes, however, it is necessary for the surface of the flesh of the skinned carcass to remain uniformly covered by the adipose tissue without incisions so that the adipose tissue forms a layer protecting the flesh against drying out.

For these reasons the dimensioning of tooth pitch, blade thickness, blade clearance, and tooth thickness is a decisive criterion of the skinning knife.

Since cutting with the device entails longitudinal and lateral movements over the skin, the tooth must catch neither in the skin nor the flesh and the sinews and arteries connecting them, since otherwise too great an effort is required for guiding the device. If the teeth catch in the tissue, there is the further danger that remains of the tissue may be cut off and foul the cutting edge of the blade and thus substantially reduce the cutting effort of the blade. Inter alia it is the function of the teeth lightly to fix the adipose tissue along the direction of movement of the cutting edge, so that it is prevented from being carried along with the cutting edge. This makes the design of the tooth shape considerably more difficult.

One object of the invention is to provide a power operated skinning knife in which the blade is moved longitudinally along a slightly curved pathway and in which the cutting blade is protected by adjustable members on opposite sides thereof and releasably held in position.

Another object is to provide a power operated skinning knife as above set forth in which said protector members are adjustably mounted on the grip housing of said skinning knife to permit the protector members to be adjusted with respect to said blade edge when hides and skins of various thickness of different animals are removed from the carcasses.

Another object is to provide a skinning knife in which the protector members are provided along their operative edges with a series of teeth adapted to grip the skin of the animal during the cutting operation and prevent the protector members from moving in a direction opposite to the direction of cutting blade movement in both directions of its cutting movement.

Other objects and advantages of the invention will become apparent during the course of the following description taken with the accompanying drawings.

An example of the subject matter of the invention is shown in the drawing in which.

Figure 2:
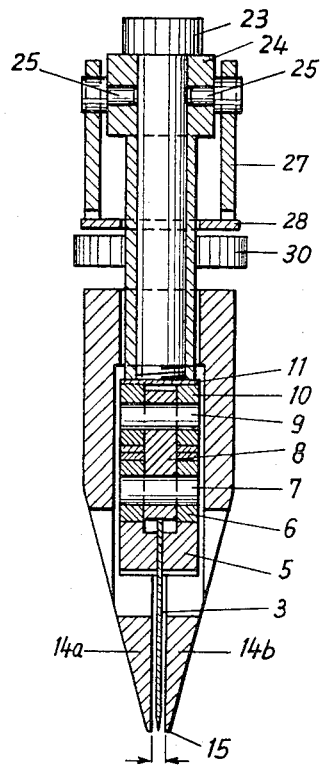
FIG. 2 is a section on the line II—II in FIG. 1.

In the grip housing 16 of the skinning knife a motor (not shown), e.g. a pneumatic motor, known per se, is provided which gives the driving spindle 1, a linear reciprocating movement. The forward end of the spindle 1 is slightly conical in shape as at 1b and a stop ring 1a is mounted on the driving spindle 1 to provide a stop for the clamp of a blade holder 2 which is mounted on said spindle and which is clamped thereon by means of the bolt 2a. The blade holder 2 is rigidly connected to the blade 3. It could, for example, be made of synthetic material and bonded, or bonded and additionally riveted to the blade. Bearing brackets 5, arranged in spaced relation into which journals 6 (FIG. 2) are pressed, are attached to the blade 3 on opposite sides thereof by means of rivets 4.

By means of a shaft 7 a rocking lever 8 is pivotally attached to the bearing bracket 5, the rocking lever 8 being by means of a second shaft 9, detachably mounted on the bracket 13, which is rigidly connected to the grip housing 16. For this purpose the shaft 9 is mounted in spaced journal bearings 10 which are affixed to a bearing support 11. The bearing support is formed by a leaf spring, having one end encompassing spaced journal bearings 10. The other end of the bearing support 11 has affixed thereto a dowel pin 12 which engages in a bore 20 of the bracket 13. Furthermore the bearing support 11 is clamped to the bracket 13 by means of a screw 30. The bracket 13 has an oblique surface 19 against which the bent round portion of the bearing support 11 lies.

Furthermore a screw 23 is fixed in the bracket 13, which clamps a square-headed tubular distance piece 24 to said bracket. Two dowel pins 25, about which the lever 26 pivots, are secured in place by being pressed into this head. The lever 26 carries two cams 27 adjacent its pivoted end which, in the normal position of the lever 26 shown in FIGS. 1 and 2 engage and press downwardly on a spring steel plate 28, which is part of the structure of the removable blade protector which encompasses the two protector members 14a, 14b which are riveted or screwed together. The plate 28 lies on the collars 29 of two adjusting screws 30, 31 which are screwed into correspondingly threaded openings in between the ribs on the upper portion of the side or protector members 14a, 14b and both have knurled heads so that they can be easily adjusted by hand. This structure is similar to that shown in my United States Patent Number 2,911,717, issued November 10, 1959, to F. Knoll. The screw 30 contacts the bearing support 11 which lies on the bracket 13. The screw 31 has a point 32 which rests in a conical bore 33 of a slide carriage member 34, which is slidably mounted on the bracket 13. Instead of a point 32 the screw 31 could also have a hemispherical end and the bore 33 could be in the form of a spherical socket.

The slide member 34 has an oblique face 35 and its slotted rear wall engages the groove 37 of a knurled screw whose axis is parallel to the driving spindle 1, and which is screwed into the bridge 21 which in turn is rigidly connected with the grip housing 16. A pre-tensioned tension spring 18 connects the plate 28 with the bridge 21.

The skinning knife is adjusted as follows:

By turning the knurled screws 30, 31 the blade protector members 14a, 14b can be raised or lowered relative to the blade 3. Likewise, by unequal displacement of the two screws 30, 31 the angular position relative to the blade 3 can be varied. By turning the screw 36 the slide member which has the conical bore 33 with which the point 32 of the screw 31 engages, and thereby also the blade protector members 14a, 14b, are displaced along the blade 3. Thus by means of the three screws 30, 31 and 36 the blade protector member can be adjusted in such a way that the cutting edge of the blade 3 does not protrude anywhere beyond the teeth 15.

Figure 1:
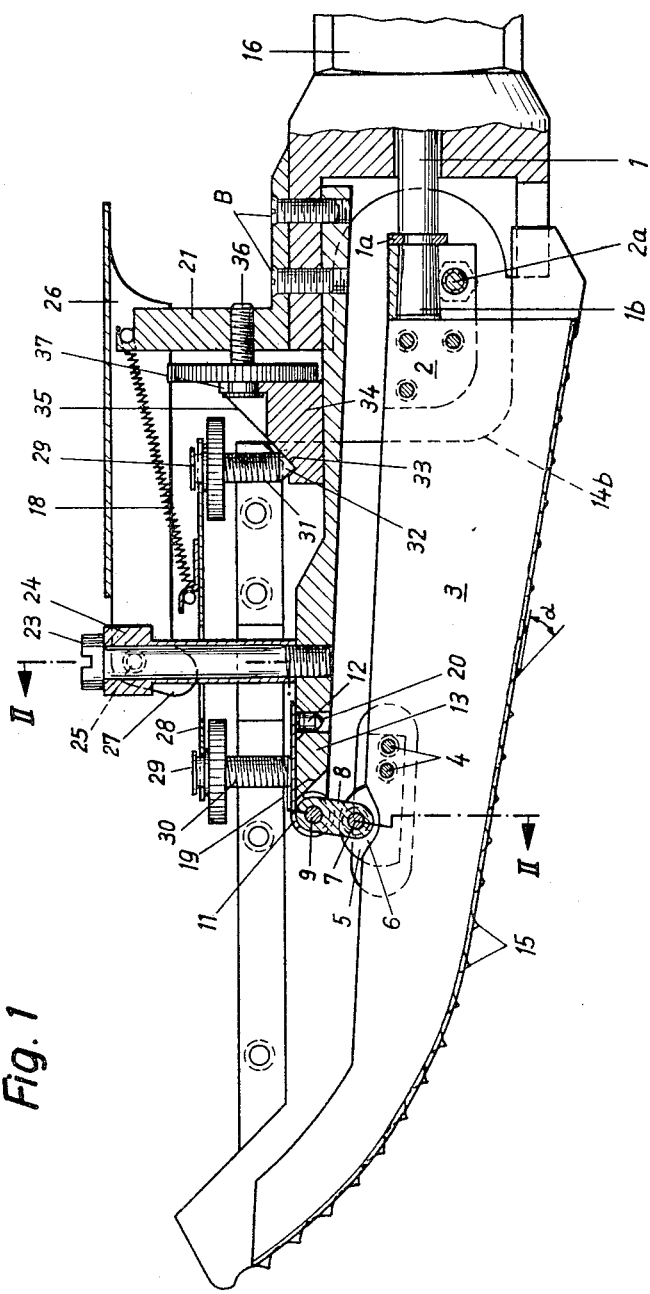
FIG. 1 is a longitudinal section through a skinning knife.

For the purpose of sharpening the blade 3, the lever 26 is pivoted from the position shown in FIGURE 1 about the spindles 25 so that the cams 27 no longer lie on the plate 28. The spring 18 then draws the blade protector member 14a, 14b rearwardly upwards over the oblique face 35 so that it exposes the blade in the region of its cutting edge for sharpening. When the lever is returned to its original position, the blade protector member slides back into its original position. Thus the lever can be constructed in such a way that it secures the adjusting screw 36 against displacement when the former is in its closed position.

Figure 3A:
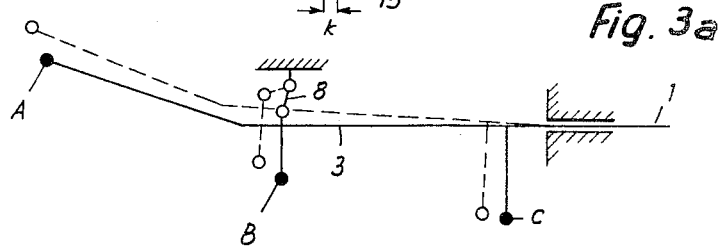
FIGS. 3a and 3b show diagrammatically two different ways of guiding the knife blade.

The suspension of the knife blade 3 by a rocking lever 8 is shown diagrammatically in FIG. 3a. It will be seen that the driving spindle 1 is flexible and is yieldingly flexed and deformed slightly in the course of its reciprocating movement. As it reciprocates, the cutting edge of the blade, of which three points A, B, C are emphasized in FIGS. 3a and 3b, describes a two-dimensional curved movement at its straight portion as well as its front curved portion, at each of its points, which has its maximum velocity in its most effective position in the region of the tooth apices. Moreover the tooth apex A describes a longer path as compared with the points B and C of the cutting edge of the blade, whereby the cutting effort in this region is increased, which is labour saving for the operator.

Figure 3B:
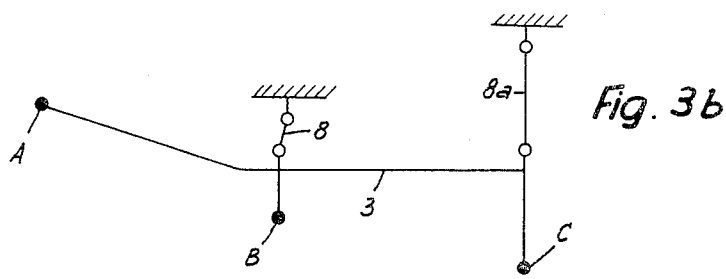

Instead of guiding the blade by means of a yieldable and flexible driving spindle 1 and only one rocking lever 8, as shown in FIGS. 1 and 3a, it could, as shown diagrammatically in FIG. 3b, also be suspended by two rocking levers 8 and 8a, which could be of different length. This construction results in the points A, B, C describing movements which follow different curves, the individual points passing through their lowest positions at different times. The same kind of movement of the blade could also be achieved by guide curves instead of rocking levers.

The blade 3 and its mounting constitute working parts which have to be exchanged after a certain operating period because of wear. This can be done in a simple manner by releasing the screw 23, unhooking the spring 18 and withdrawing the blade protector members 14a, 14b from the bracket 13. The bolt 2a is released from the clamping portion of the blade holder 2 and the now exposed blade, with the bearing support 11 is raised over the oblique face 19 of the bracket 13 and detached from the support 13 and the blade 3 is withdrawn from the spindle 1. For insertion of a new blade the procedure is reversed.

By extensive trials the following values were determined with regard to the pitch and form of the teeth as well as the clearance between the blade 3 and the blade protector member 14a, 14b.

The tooth pitch, i.e. the distance between two teeth on one side member of the blade protector member should be not more than 8 mm. The so-called gliding angle $\alpha$ (FIG. 1) i.e. the angle between the line connecting two tooth apices and the tangent to the recess curve in a tooth apex may be not exceed 60°. The thickness of the blade 3 should be no more than 0.7 mm., the slot $k$ between the members 14a and 14b (FIG. 2) may not exceed 0.9 mm., and the difference between the blade guide slot $k$ and the thickness of the blade 3 may not exceed 0.45 mm.

While I have described herein and illustrated in the accompanying drawings what may be considered a typical and particularly useful embodiment of my said invention I wish it to be understood that I do not limit myself to the particular details and dimensions described and illustrated; for obvious modifications will occur to a person skilled in the art.

What I claim as my invention and desire to secure by Letters Patent is:

1. A skinning knife, comprising a housing, a motor driven shaft mounted in said housing, a cutting blade detachably connected to one end of said shaft, a bracket affixed to said housing and arranged to extend above said cutting blade, a pair of protector members arranged in spaced relation and disposed on opposite sides of said blade with the free edges thereof corresponding in shape to the cutting edge of said blade, first and second adjustable screws arranged in spaced relation and disposed between said pair of protector members and above said blade for adjusting the lower edges of said protector members relative to said blade edge, a carriage slidably mounted on said bracket having a depression for receiving said first adjusting screw, a yielding spring plate connecting the upper ends of said first and second adjusting screws, a pivoted lever movable from an inoperative position to an operative position and supported by said bracket, a cam portion on said pivoted lever engageable with said yielding spring plate to yieldingly urge said protective members in a direction toward said cutting edge when said lever is in its operative position, a bearing support supported by said bracket engageable by said second adjusting screw when said pivoted lever is in its operative position to hold said bearing support securely against the upper portion of said bracket, and a third adjusting screw connected to said slidable carriage to move the same in a longitudinal direction parallel with said motor driven shaft and simultaneously slide said protector members in a direction longitudinally with respect to said blade so that the lower edges thereof will be adjusted relative to the cutting edge of said blade, said second adjusting screw being arranged to engage said bearing support and securely hold the same in position during operation of the skinning knife.

2. A skinning knife according to claim 1, wherein said carriage has an oblique face which is engaged by and co-operates with said first adjusting screw, and including a tensioning spring connected to said spring plate, the arrangement being such that after movement of the pivoted locking lever to an inoperative position, the blade protector members will be displaced rearwardly and upwardly towards the housing.

3. A skinning knife according to claim 5, wherein said first adjusting screw has a conical point which engages in a corresponding recess in said carriage, said recess being adjacent to said oblique face.

4. A skinning knife according to claim 1, wherein the thickness of the knife blade does not exceed 0.7 mm.

5. A skinning knife according to claim 1, wherein the space between said protector members does not exceed 0.9 mm.

6. A skinning knife according to claim 1, wherein the difference between the space between said protector members and the thickness of the knife blade does not exceed 0.45 mm.

7. A skinning knife according to claim 1, wherein the longitudinal pitch of the tooth apices does not exceed 8 mm.

8. A skinning knife according to claim 1, wherein the angle between the line joining two tooth apices in the longitudinal direction and the tangent to the recess curve between two teeth does not exceed 60°.

References Cited by the Examiner
UNITED STATES PATENTS

| | | | |
|---|---|---|---|
| 1,139,026 | 5/1915 | Gardner et al. | 82—21 |
| 2,596,078 | 5/1952 | Prohaska | 17—21 X |
| 2,692,621 | 10/1954 | Steiner | 143—63 X |
| 2,911,717 | 11/1959 | Knoll | 30—272 |

WILLIAM FELDMAN, *Primary Examiner.*

LUCIE H. LAUDENSLAGER, *Examiner.*